(12) United States Patent
Kawaura

(10) Patent No.: US 9,317,228 B2
(45) Date of Patent: Apr. 19, 2016

(54) PRINTING APPARATUS, INFORMATION PROCESSING APPARATUS, CONTROL METHOD, AND STORAGE MEDIUM

(71) Applicant: CANON KABUSHIKI KAISHA, Tokyo (JP)

(72) Inventor: Toshinori Kawaura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/186,719

(22) Filed: Feb. 21, 2014

(65) Prior Publication Data

US 2014/0285841 A1 Sep. 25, 2014

(30) Foreign Application Priority Data

Mar. 22, 2013 (JP) ................................ 2013-060267

(51) Int. Cl.
*G06F 3/00* (2006.01)
*G06F 3/12* (2006.01)
*G06K 15/00* (2006.01)

(52) U.S. Cl.
CPC .............. *G06F 3/121* (2013.01); *G06F 3/1229* (2013.01); *G06F 3/1285* (2013.01); *G06F 3/1259* (2013.01)

(58) Field of Classification Search
CPC ..... G06F 3/121; G06F 3/1229; G06F 3/1285; G06F 3/1259; G06F 3/1294
USPC ............ 358/1.11–1.18, 400–404; 710/15–20; 709/217–219
See application file for complete search history.

(56) References Cited

U.S. PATENT DOCUMENTS

| | | | |
|---|---|---|---|
| 6,970,869 B1* | 11/2005 | Slaughter et al. | |
| 2006/0095498 A1* | 5/2006 | Yamauchi | 709/201 |
| 2009/0031313 A1* | 1/2009 | Tian | 718/102 |
| 2009/0089802 A1* | 4/2009 | Wang et al. | 719/318 |
| 2010/0332677 A1* | 12/2010 | Tian | 709/233 |

OTHER PUBLICATIONS

"Print Service Definition Version 1.1. For Web Services on Devices." Microsoft Corporation. Jul. 24, 2012: 1-109.

* cited by examiner

*Primary Examiner* — Chad Dickerson
(74) *Attorney, Agent, or Firm* — Canon U.S.A., Inc. IP Division

(57) ABSTRACT

If a request for first element data and second element data is received, delay data indicating that notification of the second element data is to be delayed and the first element data are sent as response data in response to the received request, and thereafter notification of the second element data is sent.

13 Claims, 13 Drawing Sheets

```
<wsdst:GetPrinterElementsResponse>
  <wsdst:ElementData Name="wsdst:PrinterStatus" Valid="true">
    <wsdst:PrinterStatus>
      ......</wsdst:PrinterStatus>
  </wsdst:ElementData>
  <wsdst:ElementData Name="wsdst:DefaultPrintTicket" Valid="true">
    <wsdst:DefaultPrintTicket>
      ......</wsdst:DefaultPrintTicket>
  </wsdst:ElementData>
  ......
  <wsdst:ElementData Name="ihv:Status" Valid="false" />         ─811
  <wsdst:ElementData Name="ihv:Status_delay" Valid="false" />   ─812
  <wsdst:ElementData Name="ihv:Capability" Valid="true">
    <ihv:Capability>
      ......</ihv:Capability>
  </wsdst:ElementData>
</wsdst:GetPrinterElementsResponse>
```

```
<wsdst:GetPrinterElementsResponse>
  <wsdst:ElementData Name="wsdst:PrinterStatus" Valid="true">
    <wsdst:PrinterStatus>
      ......</wsdst:PrinterStatus>
  </wsdst:ElementData>
  <wsdst:ElementData Name="wsdst:DefaultPrintTicket" Valid="true">
    <wsdst:DefaultPrintTicket>
      ......</wsdst:DefaultPrintTicket>
  </wsdst:ElementData>
  ......
  <wsdst:ElementData Name="ihv:Status" Valid="retry" />         ─821
  <wsdst:ElementData Name="ihv:Capability" Valid="true">
    <ihv:Capability>
      ......</ihv:Capability>
  </wsdst:ElementData>
</wsdst:GetPrinterElementsResponse>
```

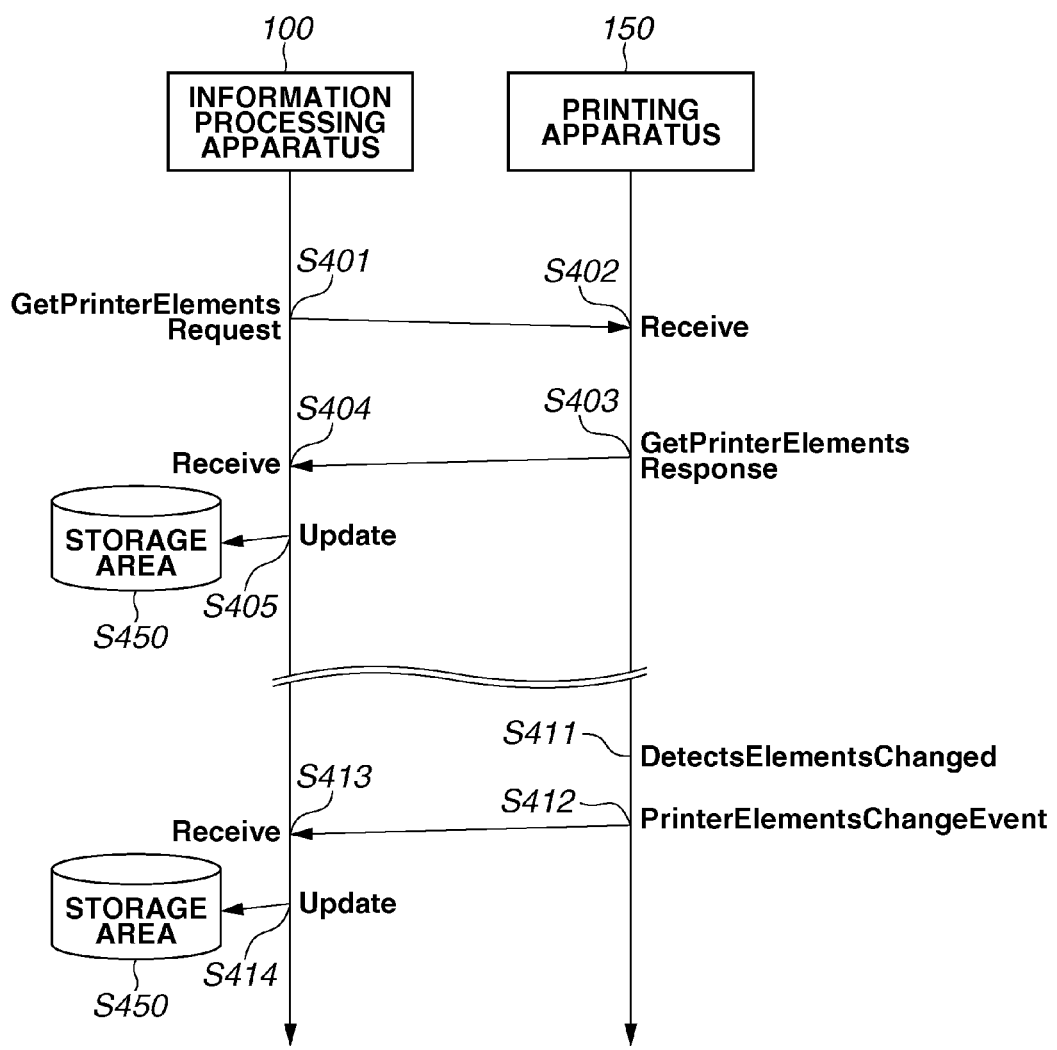

ATTRIBUTE VALUE
<Value name="Value" ... /> ~502
ATTRIBUTE INFORMATION

FIG.5A

```
<Schema xmlns:ihv="http://www.ihv.com/2008/01/print">                    501
  <Property name="Printer">
    <Property name="IHV">
      <Property name="Status">
        <Value name="Value" drvPrinterEvent="false" query="ihv:Status"
               filter="//ihv:StatusRes" type="BIDI_STRING"/>              502
      </Property>
      <Property name="Capability">
        <Value name="Value" drvPrinterEvent="false" query="ihv:Capability"
               filter="//ihv:CapabilityRes" type="BIDI_STRING"/>          503
      </Property>
    </Property>
  </Property>
</Schema>
```

FIG.5B

```
<Schema xmlns:ihv="http://www.ihv.com/2008/01/print">
  <Property name="Printer">
    <Property name="IHV">
      <Property name="Status">
        <Value name="Value" drvPrinterEvent="false" query="ihv:Status"
               filter="//ihv:StatusRes" type="BIDI_STRING"/>              511
      </Property>
      <Property name="Status">
        <Value name="Value" drvPrinterEvent="false" query="ihv:Status_delay"
               filter="//ihv:StatusRes" type="BIDI_STRING"/>              512
      </Property>
      <Property name="Capability">
        <Value name="Value" drvPrinterEvent="false" query="ihv:Capability"
               filter="//ihv:CapabilityRes" type="BIDI_STRING"/>          513
      </Property>
    </Property>
  </Property>
</Schema>
```

FIG.5C

```
<Schema xmlns:ihv="http://www.ihv.com/2008/01/print">
  <Property name="Printer">
    <Property name="IHV">
      <Property name="Status">
        <Value name="Value" drvPrinterEvent="false" query="ihv:Status"
               filter="//ihv:StatusRes" type="BIDI_STRING" delay="true"/> 521
      </Property>
      <Property name="Capability">
        <Value name="Value" drvPrinterEvent="false" query="ihv:Capability"
               filter="//ihv:CapabilityRes" type="BIDI_STRING"/>
      </Property>
    </Property>
  </Property>
</Schema>
```

<wsdst:Name>wsdst:PrinterStatus</wsdst:Name> ~702

START ELEMENT | ELEMENT DATA | END ELEMENT

```
<wsdst:GetPrinterElementsRequest>
 <wsdst:RequestedElements>                              ~701
  <wsdst:Name>wsdst:PrinterStatus</wsdst:Name>          ~702
  <wsdst:Name>wsdst:DefaultPrintTicket</wsdst:Name>     ~703
      ……
  <wsdst:Name>ihv:Status</wsdst:Name>                   ~704
  <wsdst:Name>ihv:Capability</wsdst:Name>               ~705
 </wsdst:RequestedElements>
</wsdst:GetPrinterElementsRequest>
```

FIG.7B

```
<wsdst:GetPrinterElementsRequest>
 <wsdst:RequestedElements>
  <wsdst:Name>wsdst:PrinterStatus</wsdst:Name>
  <wsdst:Name>wsdst:DefaultPrintTicket</wsdst:Name>
      ……
  <wsdst:Name>ihv:Status</wsdst:Name>
  <wsdst:Name>ihv:Status_delay</wsdst:Name>             ~711
  <wsdst:Name>ihv:Capability</wsdst:Name>
 </wsdst:RequestedElements>
</wsdst:GetPrinterElementsRequest>
```

FIG.8A

```
<wsdst:GetPrinterElementsResponse>
  <wsdst:ElementData Name="wsdst:PrinterStatus" Valid="true">     ~801
    <wsdst:PrinterStatus>                                          ~802
      ......</wsdst:PrinterStatus>
  </wsdst:ElementData>
  <wsdst:ElementData Name="wsdst:DefaultPrintTicket" Valid="true">
    <wsdst:DefaultPrintTicket>                                     ~803
      ......</wsdst:DefaultPrintTicket>
  </wsdst:ElementData>
  ......
  <wsdst:ElementData Name="ihv:Status" Valid="true">
    <ihv:Status>                                                   ~804
      ......</ihv:Status>
  </wsdst:ElementData>
  <wsdst:ElementData Name="ihv:Capability" Valid="true">
    <ihv:Capability>                                               ~805
      ......</ihv:Capability>
  </wsdst:ElementData>
</wsdst:GetPrinterElementsResponse>
```

FIG.8B

```
<wsdst:GetPrinterElementsResponse>
  <wsdst:ElementData Name="wsdst:PrinterStatus" Valid="true">
    <wsdst:PrinterStatus>
      ......</wsdst:PrinterStatus>
  </wsdst:ElementData>
  <wsdst:ElementData Name="wsdst:DefaultPrintTicket" Valid="true">
    <wsdst:DefaultPrintTicket>
      ......</wsdst:DefaultPrintTicket>
  </wsdst:ElementData>
  ......
  <wsdst:ElementData Name="ihv:Status" Valid="false" />            ~811
  <wsdst:ElementData Name="ihv:Status_delay" Valid="false" />      ~812
  <wsdst:ElementData Name="ihv:Capability" Valid="true">
    <ihv:Capability>
      ......</ihv:Capability>
  </wsdst:ElementData>
</wsdst:GetPrinterElementsResponse>
```

FIG.8C

```
<wsdst:GetPrinterElementsResponse>
  <wsdst:ElementData Name="wsdst:PrinterStatus" Valid="true">
    <wsdst:PrinterStatus>
      ......</wsdst:PrinterStatus>
  </wsdst:ElementData>
  <wsdst:ElementData Name="wsdst:DefaultPrintTicket" Valid="true">
    <wsdst:DefaultPrintTicket>
      ......</wsdst:DefaultPrintTicket>
  </wsdst:ElementData>
  ......
  <wsdst:ElementData Name="ihv:Status" Valid="retry" />            ~821
  <wsdst:ElementData Name="ihv:Capability" Valid="true">
    <ihv:Capability>
      ......</ihv:Capability>
  </wsdst:ElementData>
</wsdst:GetPrinterElementsResponse>
```

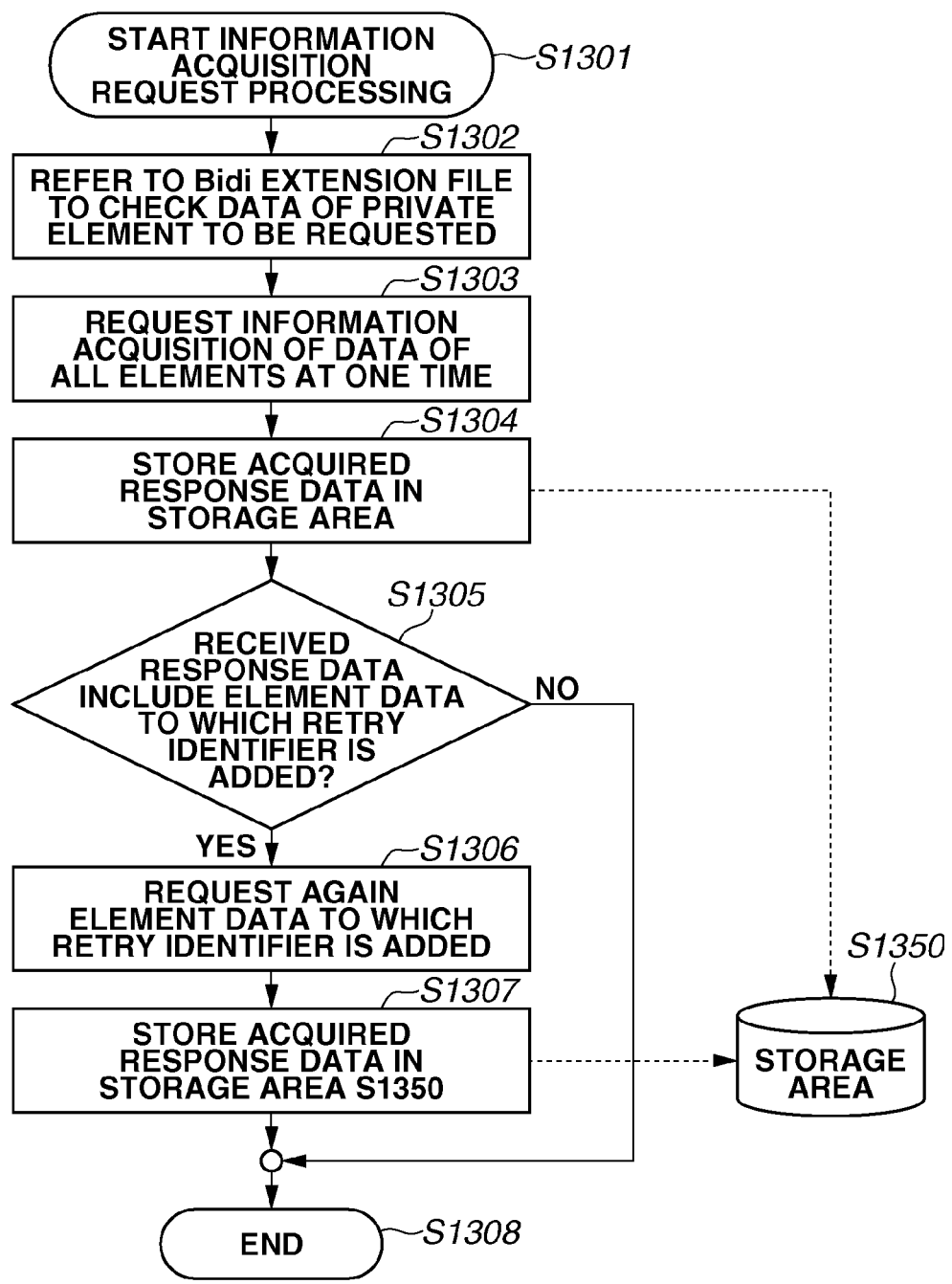

PRINTING APPARATUS, INFORMATION PROCESSING APPARATUS, CONTROL METHOD, AND STORAGE MEDIUM

BACKGROUND

1. Field

The present subject matter relates to a technique for communication between an information processing apparatus and a printing apparatus.

2. Description of Related Art

Print Service Definition v1.1 for Web Services on Devices (referred to herein as Non-Patent Literature Document 1) discusses a technique by which a client computer requests a specific element from a printer and a technique by which the printer responds with the specific element.

SUMMARY

A situation is assumed in which there is a limitation on the size of response data with which an image processing apparatus responds and the image processing apparatus cannot respond or an error occurs if the size of the response data exceeds the size limit.

However, Non-Patent Document 1 does not consider the situations in which the size of response data exceeds the size limit at the time of responding. Thus, when the technique discussed in Non-Patent Document 1 is used in the above situations, responding may be impossible, or an error may occur.

The present subject matter is directed to a technique capable of reducing the possibility that the size of response data exceeds a size limit.

According to an aspect of the present subject matter, an image processing apparatus includes a receiving unit configured to receive a request for first element data and second element data, a responding unit configured to respond with delay data indicating that notification of the second element data is to be delayed and the first element data as response data in response to the request received by the receiving unit if the receiving unit receives the request for the first element data and the second element data, and a notifying unit configured to notify the second element data after the responding unit responds with the response data.

According to another aspect of the present subject matter, an information processing apparatus includes a first requesting unit configured to send a request for element data to an image processing apparatus, a receiving unit configured to receive response data in response to the request after the first requesting unit sends the request, a determining unit configured to determine whether the response data includes information indicating that the element data is to be acquired again, and a second requesting unit configured to send a request for the element data again to the image processing apparatus if the determining unit determines that the response data includes the information indicating that the element data is to be acquired again.

Further features of the present subject matter will become apparent from the following description of exemplary embodiments with reference to the attached drawings.

BRIEF DESCRIPTION OF THE DRAWINGS

FIG. 4 is a sequence diagram illustrating a flow of information communication between an information processing apparatus and a printing apparatus.

FIGS. 5A, 5B, and 5C are diagrams illustrating contents of a Bidi extension file.

FIGS. 7A and 7B are diagrams illustrating contents of an information acquisition request.

FIGS. 8A, 8B, and 8C are diagrams illustrating response data.

FIG. 13 is a flow chart illustrating information acquisition request processing of an information processing apparatus.

DESCRIPTION OF THE EMBODIMENTS

Figure 1:
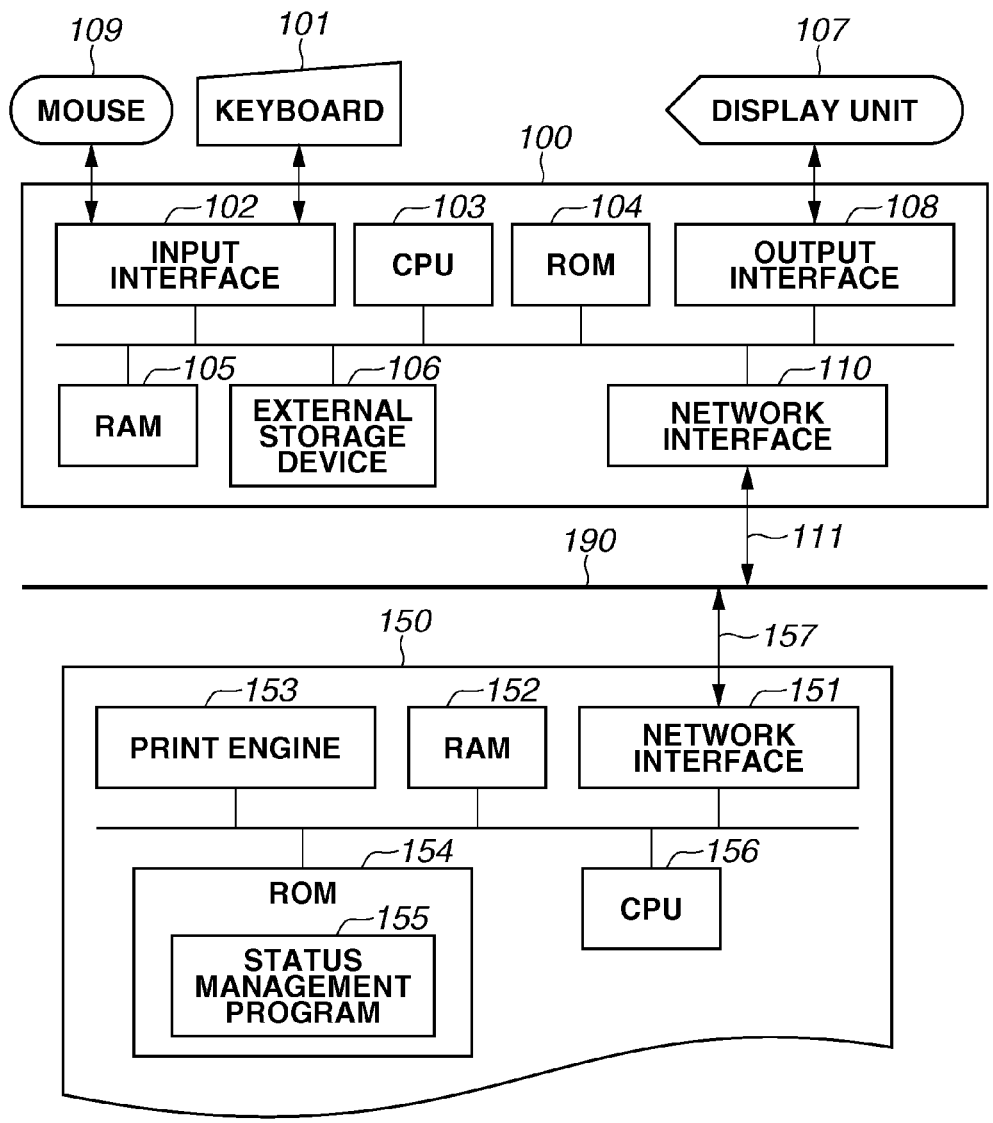
FIG. 1 is a block diagram illustrating configurations of a printing apparatus and an information processing apparatus.

Various exemplary embodiments, features, and aspects of the subject matter will be described in detail below with reference to the drawings. It is noted that the following exemplary embodiments are in no way intended to limit the scope of the invention according to the claims, and all combinations of features described in the exemplary embodiments are not necessarily essential.

Standardization has been promoted in the field of network printing systems in which a plurality of information processing apparatuses shares a printing apparatus that is an example of an image processing apparatus. An example of a network printing system using Web Services on Devices (WSD) for printing will be described. In the network printing system, an event-based protocol can be used. Furthermore, using an event notified from the printing apparatus to the information processing apparatuses, the information processing apparatuses can execute various controls based on the event. For example, the printing apparatus notifies the information processing apparatuses of the current status of the printing apparatus by using a PrinterElementsChange event, which notifies that the status has been changed.

Meanwhile, if an information processing apparatus that is newly connected to the network only uses event-based information notification processing, the information processing apparatus does not receive notification about the status of the printing apparatus until the status of the printing apparatus is changed after the information processing apparatus is connected to the network. In other words, applications running in the information processing apparatus that is newly connected to the network cannot have information about the printing apparatus until the status of the printing apparatus is changed next. Thus, a unit is provided to enable the information processing apparatus to send an active request for information about the printing apparatus (GetPrinterElementsRequest Operation). When a connection is established between the printing apparatus and the information processing apparatus that is newly connected to the network, the information processing apparatus first requests various types of information about the printing apparatus, so that the information processing apparatus can acquire information about the printing apparatus.

A GetPrinterElementsRequest is designed so that an acquisition request for a plurality of pieces of information can be made at one time. A GetPrinterElementsResponse, which is a response to the acquisition request, is designed so that a GetPrinterElementsRequest sent at one time is responded at one time.

However, with the high-performance of the recent printing apparatuses, the size of information of a printing apparatus has increased. The size of a GetPrinterElementsResponse that can be received by an information processing apparatus is limited. The size of a GetPrinterElementsResponse, which is a response to a GetPrinterElementsRequest, may exceed a data size that can be received by an information processing apparatus. If an information acquisition request is sent one by one so as not to exceed the size limit of received data, the size of received data in response to one request is reduced. However, the responding processing load of the printing apparatus increases, because a plurality of responses needs to be sent in response to a plurality of GetPrinterElementsRequests. A system that can solve the above problem is described below.

Configurations of an information processing apparatus and a printing apparatus according to the present exemplary embodiment will be described below with reference to FIG. 1.

An information processing apparatus 100 includes an input interface 102, a central processing unit (CPU) 103, a read-only memory (ROM) 104, a random-access memory (RAM) 105, an external storage device 106, an output interface 108, a display unit 107, a keyboard 101, a mouse 109, and a network interface 110. The network interface 110 is connected to a network 190 via a network cable 111. The ROM 104 stores an initialization program. The external storage device 106 stores application programs, an operating system (OS), a printer driver, and various types of data. The RAM 105 is used as a work memory by various programs stored in the external storage device 106. Furthermore, the CPU 103 executes processing based on a program stored in the external storage device 106, whereby the software configuration of the information processing apparatus 100 as illustrated in FIG. 2 and processing of each step in flow charts described below are realized.

The printing apparatus 150 includes a network interface 151, a RAM 152, a print engine 153, a ROM 154, and a CPU 156. The network interface 151 is connected to the network 190 via a network cable 157. The RAM 152 is used as a main memory and a work memory for the CPU 156, and stores various types of data and a receiving buffer for temporarily storing received print jobs. The print engine 153 executes printing based on data stored in the RAM 152. The ROM 154 stores various types of control programs such as a status management program 155, and data used by each control program. The CPU 156 controls each unit of the printing apparatus 150 according to the control programs. The status management program 155 is a program for monitoring the status of the printing apparatus 150 based on information of various types of sensors (not illustrated) in the printing apparatus, generating status information, and storing the status information in the RAM 152. The printing apparatus 150 generates response data and event data described below based on the generated status information. Furthermore, the CPU 156 executes processing based on a program stored in the ROM 154, whereby processing of each step in the flow charts described below is realized.

While an example of how processing is assigned to the information processing apparatus 100 and the printing apparatus 150 is described above, the form of assignment is not particularly limited to the above-described example, and any other form can be adopted.

Figure 2:
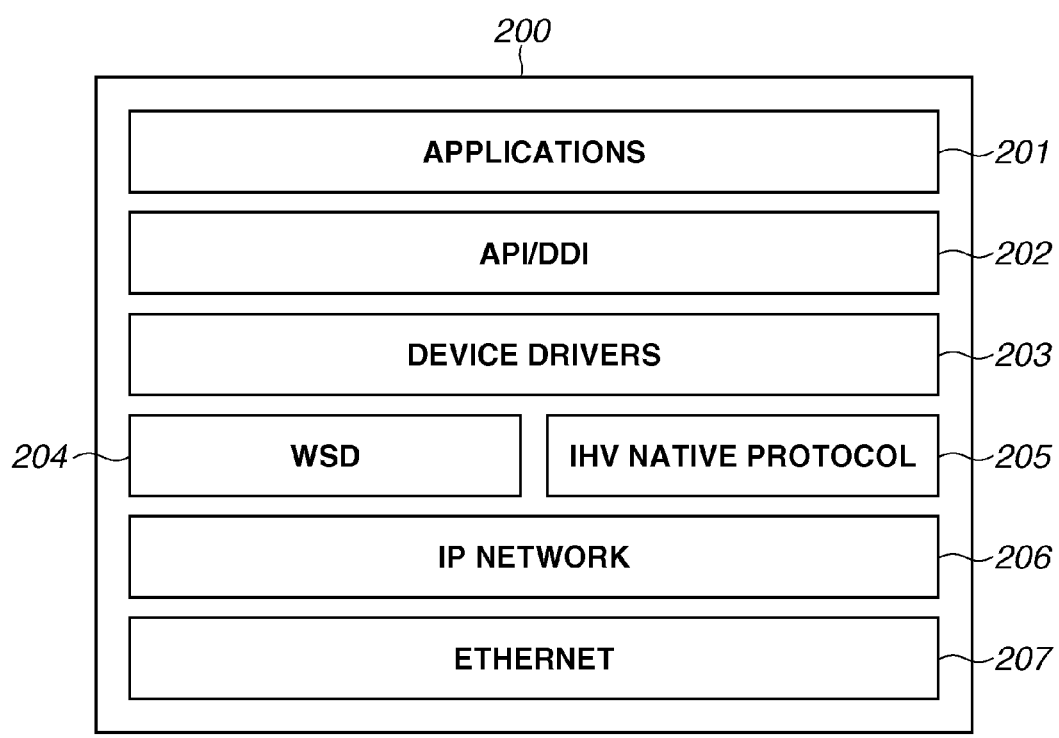
FIG. 2 is block diagram illustrating a software configuration of an information processing apparatus.

FIG. 2 is a block diagram illustrating the software configuration of the information processing apparatus 200 (100). In FIG. 2, an Ethernet control stack 207 controls the Ethernet. An Internet protocol (IP) network control stack 206 controls an IP network. A WSD control stack 204 controls a WSD. An independent hardware vendor (IHV) native protocol control stack 205 controls IHV-specific protocols. Device drivers 203 include standard drivers preinstalled in the OS and IHV drivers provided by IHVs. A printer driver 321 configured to control the printing apparatus 150 is also one of the drivers. The printer driver 321 will be described below. An application/DDI interface 202 includes an application programming interface (API) and a device driver interface (DDI). The information processing apparatus 200 (100) also includes applications 201.

Figure 3:
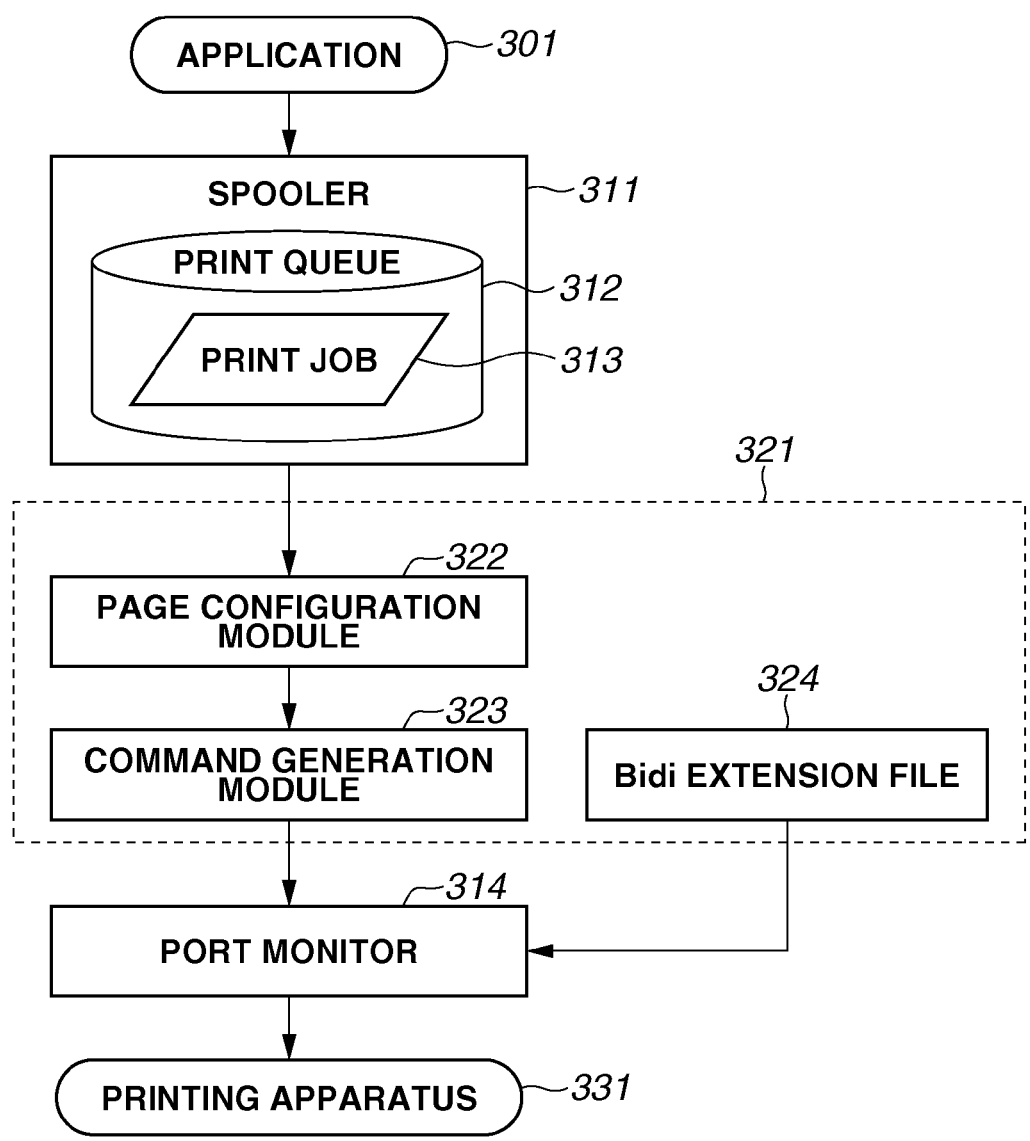
FIG. 3 is a block diagram illustrating a flow of data from an application to a printing apparatus.

FIG. 3 is a block diagram illustrating a flow of data from an application to the printing apparatus 150. An application 301 (one of the applications 201) requests the OS to execute print processing by using an application programming interface (API) for print instructions that is provided by the OS. The request for print processing is processed by a spooler 311 in the OS. When the spooler 311 receives the request for printing from the application 301, the spooler 311 stores the request for printing in a print queue 312 as a print job 313. The spooler 311 stores in the print queue 312 a plurality of print jobs 313 from a plurality of applications 301 in the information processing apparatus 100. The spooler 311 sequentially transmits to the printer driver 321 the print jobs 313 stored in the print queue 312. When the printer driver 321 receives the print job 313, the printer driver 321 executes page configuration processing at a page configuration module 322. The page configuration processing refers to processing in which the order of pages in one print job 313 is rearranged based on print setting information instructed by the application 301 and added to the print job 313, and processing in which a plurality of pages is laid out on a single page. When the execution of the page configuration processing by the page configuration module 322 is completed, the printer driver 321 executes processing at a command generation module 323 to convert the print job 313 into a print data format. The print data format refers to a data format that can be interpreted by the printing apparatus 150. When the command generation module 323 completes the execution of the processing to convert the print job 313 into the print data format, the printer driver 321 transmits the print job 313 to a printing apparatus 331 (150) via a port monitor 314. Based on the print job 313, the printing apparatus 331 executes printing on a recording medium such as a sheet by use of a recording material such as ink. The port monitor 314 also plays roles to send an information acquisition request to the printing apparatus 150 and receive information or an event from the printing apparatus 150. The port monitor 314 refers to a Bidi extension file 324 (described below) of the printer driver 321 to obtain information required by the printer driver 321.

The port monitor 314 may be a standard port monitor preinstalled in the OS or a vendor-specific port monitor.

FIG. 4 is a sequence diagram illustrating a flow of information communication processing of the information processing apparatus 100 and the printing apparatus 150. The flow in which the information processing apparatus 100 acquires information of the printing apparatus 150 will be described. In step S401, the information processing apparatus 100 issues a GetPrinterElementsRequest Operation (information acquisition request) to the printing apparatus 150 to request information from the printing apparatus 150. The information acquisition request stores a message ID, which is a unique ID (identifier). In step S402, the printing apparatus 150 receives the information acquisition request, and then in step S403, the printing apparatus 150 collects information corresponding to the request and issues a GetPrinterElementsResponse Operation (information acquisition response) to respond to the information processing apparatus 100. In the information acquisition response, response data is transmitted to the information processing apparatus 100. The response data stores the message ID transmitted at the time of the information acquisition request as an identification (ID) associated with the information acquisition response. This enables the information processing apparatus 100 to identify an information acquisition request that corresponds to the information acquisition response (or response data). In step S404, the information processing apparatus 100 receives the information acquisition response, and then in step S405, the information processing apparatus 100 updates information stored in a storage area (S450) by using the received information.

The flow in which when information of the printing apparatus 150 is changed, the printing apparatus 150 executes event notification to the information processing apparatus 100, will be described. In step S411, the printing apparatus 150 detects that information of the printing apparatus 150 is changed, and then in step S412, the printing apparatus 150 generates event data and issues a PrinterElementsChangeEvent to the information processing apparatus 100. The PrinterElementsChangeEvent issuing processing is referred to as an event notification, and content of the event notification is referred to as event data. The event notification is different from the information acquisition response in that the event notification can be transmitted even if the information processing apparatus 100 does not request. Furthermore, there is no ID associated with the event notification. In step S413, the information processing apparatus 100 receives the event notification, and then in step S414, the information processing apparatus 100 updates information stored in the storage area (S450) based on the received information.

As used herein, the issuance of an information acquisition response in response to an information acquisition request when the information acquisition request is received is referred to as "response", whereas spontaneous transmission of event data without designating an associated ID as described above is referred to as "notification".

A configuration in which the port monitor (WSD port monitor) 314 of the OS executes processing that is to be executed on the information processing apparatus 100 side to issue an information acquisition request, receive response data, receive event data, and update the storage area S450 with received information is described.

FIG. 5A is a diagram illustrating contents of the Bidi extension file 324. In the Bidi extension file 324, data of private elements to be requested to the printing apparatus 150 is described. The data of a private element will be described below. The contents described in the Bidi extension file 324 will be described below. A code 501 defines that the abbreviation for the namespace "http://www.ihv.com/2008/01/print" is "ihv". Hereinbelow, an Extensible Markup Language (XML) element, attribute information, or data to which the prefix "ihv" is added indicates that the XML element, attribute information, or data is a vendor-specific XML element, attribute information, or data customized by the IHV.

The relationship between attribute information and an attribute value as used herein will be described with reference to a code 502 as an example. In the code 502, "query="ihv:Status2"" is attribute information, and "ihv:Status" enclosed in double quotation marks in the attribute information is an attribute value.

The attribute information "query="ihv:Status"" of the code 502 indicates that the printer driver 321 in the information processing apparatus 100 requires the element data "ihv:Status" of the printing apparatus 150. The port monitor 314 is informed that the element data "ihv:Status" is required so that the port monitor 314 operates to leave the element data "ihv:Status" in the storage area S450. In a code 503, the attribute information "query="ihv:Capability"" indicates that the printer driver 321 in the information processing apparatus 100 requires the element data "ihv:Capability" of the printing apparatus 150. An element that begins with ihv such as "ihv:Status" and "ihv:Capability" is referred to as a private element. Element data that is enclosed in private elements in the XML configuration and with which an information acquisition response or event notification is sent to the information processing apparatus 100 by the printing apparatus 150 is referred to as data of a private element. The relationship between the element and the element data will be described below.

When the OS confirms that a connection has been established between the information processing apparatus 100 and the printing apparatus 150, the OS sends an information acquisition request to request the printing apparatus 150 to acquire information of the printing apparatus 150. The information that the OS requests the printing apparatus 150 to acquire includes WSD print service standard (public) elements (public elements) and also private elements described in the Bidi extension file 324.

The relationship between the element data and the element will be described with reference to a code 702 illustrated in FIG. 7A. As used herein, a description enclosed in angle brackets such as <wsdst:Name> and </wsdst:Name> is referred to as an element. An element that includes no slash at the beginning is a start element. An element that includes a slash at the beginning is an end element. As used herein, a description (data) between the start element and the end element is referred to as element data. As used herein, the element data is sometimes referred to as data enclosed in elements.

FIG. 7A illustrates information indicating element data that is to be requested by an information acquisition request when public elements and private elements are requested at the same time. In a code 701, element data of the element "wsdst:Name", which is a child element of the element "wsdst:RequestedElements" indicates the name of element data (data of public element or data of private element) that is to be requested to the printing apparatus 150. In the information acquisition request, a plurality of the elements "wsdst:Name" can be described as child elements of the element "wsdst:RequestedElements". The prefix "wsdst" is an abbreviation of the namespace of a standard (public) WSD print service. A code 702 shows the data "wsdst:PrinterStatus" enclosed in the elements "wsdst:Name". A code 703 shows that the data "wsdst:DefaultPrintTicket" is enclosed in the elements "wsdst:Name". A code 704 shows that the data "ihv:Status" is enclosed in the elements "wsdst:Name". A code 705 shows that the data "ihv:Capability" is enclosed in the elements "wsdst:Name". As the foregoing describes, the information acquisition request illustrated in FIG. 7A indicates that a plurality of data enclosed in the elements "wsdst:Name" in the codes 702 to 704 is requested at one time to the printing apparatus 150.

Immediately after the connection is established between the information processing apparatus 100 and the printing apparatus 150, the OS requests a plurality of data at one time as illustrated in FIG. 7A. However, the size of information acquisition response data (response data) with which the printing apparatus 150 responds to the information acquisition request is limited. A possible method to reduce the size of response data and obtain all pieces of information of the printing apparatus 150 is to simply divide the public elements and the private elements, and then send an information acquisition request for each one of the divided public elements and the divided private elements. However, if all elements are divided to make an information acquisition request for each one of the divided elements, the number of times the information processing apparatus 100 sends an information acquisition request increases. Furthermore, the load on the printing apparatus 150 responding with response data to each information acquisition request also increases. Thus, the information processing apparatus 100 is demanded to request acquisition of as much information of the printing apparatus 150 as possible at one time. Further, since the OS is also likely to use the data of public elements, it is not desirable to divide an information acquisition request to cause a delay in acquisition of information. Thus, a method in which data of public elements is acquired at one time while acquisition of data of private elements is divided as many times as possible will be described below with reference to FIGS. 5B, 6, and 7B.

FIG. 5B is a diagram illustrating contents of the Bidi extension file 324. In a code 511, the attribute information "query="ihv:Status"" indicates that the printer driver 321 in the information processing apparatus 100 requires the element data "ihv:Status" of the printing apparatus 150. In a code 513, the attribute information "query="ihv:Capability"" indicates that the printer driver 321 in the information processing apparatus 100 requires the element data "ihv:Capability" of the printing apparatus 150. In a code 512, the attribute information "query="ihv:Status_delay"" shows that the identifier "_delay" is added to the element name "ihv:Status" of the code 511. In the code 512, "ihv:Status_delay" to which the identifier "_delay" is added indicates that notification of the element data "ihv:Status" (hereinafter, referred to simply as the data "Status") in response to an acquisition request of the data "Status" can be delayed. The delayed notification processing of element data will be described below with reference to FIG. 6. When a connection with the printing apparatus 150 is established, the OS requests data of a plurality of public elements and data of three private elements ("ihv:Status", "ihv:Status_delay", and "ihv:Capability") in a batch.

FIG. 7B illustrates contents of an information acquisition request that is to be made by the OS having read the Bidi extension file 324 illustrated in FIG. 5B. Compared to FIG. 7A, elements of a code 711 are added in FIG. 7B. The code 711 shows that the data "ihv:Status_delay" is enclosed in the elements "wsdst:Name". This indicates that notification of the data "Status" in response to an acquisition request of the data "ihv:Status" is allowed to delay.

Figure 6:
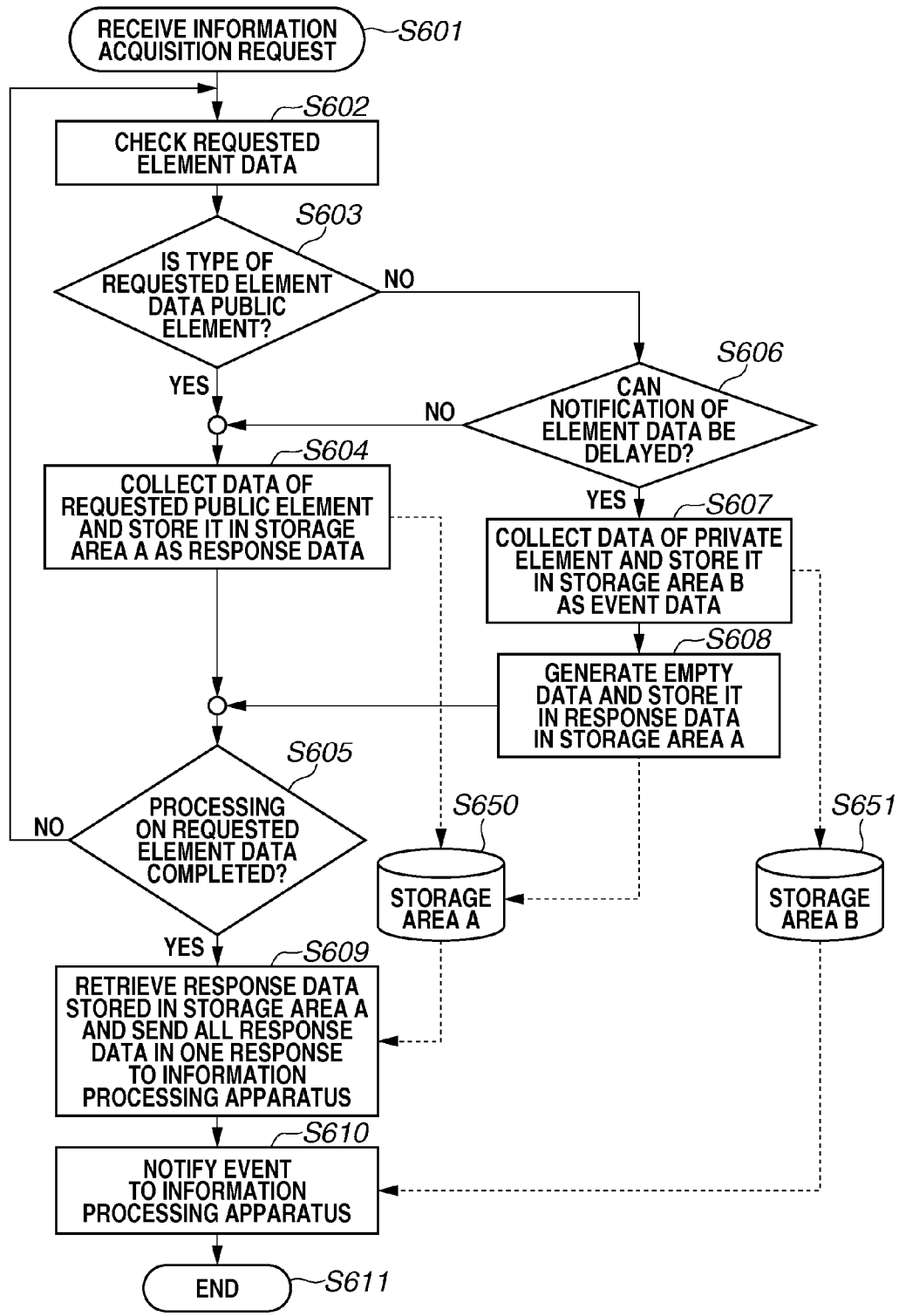
FIG. 6 is a flow chart illustrating processing of a printing apparatus having received an information acquisition request.

FIG. 6 is a flow chart illustrating processing of the printing apparatus 150 having received the information acquisition request in step S402. In step S601, the printing apparatus 150 receives the information acquisition request, and then in step S602, the printing apparatus 150 checks requested element data. The element data checking processing in step S602 includes checking the number of requested element data, determining whether the element type is a public element or a private element, and, if the element type is a private element, determining whether notification can be delayed. In step S603, the printing apparatus 150 determines whether the type of the requested element data is a public element. If the element type is a public element (YES in step S603), then in step S604, the printing apparatus 150 collects data of the requested public element as response data and stores it as response data in a storage area A (S650). In step S605, the printing apparatus 150 determines whether any of the requested element data remains unprocessed. If any of the requested element data remains unprocessed (NO in step S605), the processing returns to step S602. On the other hand, in step S603, if the printing apparatus 150 determines that the type of requested element data is data of a private element (NO in step S603), then in step S606, the printing apparatus 150 determines whether notification of the data of the private element can be delayed. In step S606, if the printing apparatus 150 determines that notification of the element data cannot be delayed (NO in step S606), then in step S604, the printing apparatus 150 collects data of the private element and stores it as response data in the storage area A (S650). On the other hand, in step S606, if the printing apparatus 150 determines that notification of the element data can be delayed (YES in step S603), then in step S607, the printing apparatus 150 collects data of the private element and stores it as element data for event notification (event data) in a storage area B (S651). In step S608, the printing apparatus 150 generates empty data (EmptyElement) of the element data (511) that notification thereof can be delayed and the element data (512) to which a delay identifier is added, and stores the generated empty data in the response data in the storage area A (S650). In step S605, if the printing apparatus 150 determines that execution of processing on each requested element data is completed (YES in step S605), the processing proceeds to step S609. In step S609, the printing apparatus 150 retrieves the response data stored in the storage area A (S650) and responds with the response data in a batch to the information processing apparatus 100 having requested the acquisition of the information. In the present exemplary embodiment, the empty data is sent in response as delay data indicating that notification of element data is to be delayed, as described above. Use of the empty data can reduce the size of the response data so that the size of the response data is smaller than the size of requested element data. In step S610, if the event data is stored in the storage area B (S651), the printing apparatus 150 sends event notification to the information processing apparatus 100 having requested the information. A destination of the event notification in step S610 may be limited to the information processing apparatus 100 having requested the acquisition of the information. This is because other information processing apparatuses on the network may have received event notification from the printing apparatus to acquire the latest information before the information processing apparatus 100 requested the acquisition of the information. In step S611, the printing apparatus 150 ends the processing of the printing apparatus 150 having received an information acquisition request.

In the present exemplary embodiment, the configuration in which event notification is executed immediately after the printing apparatus 150 responds with the response data in step S609 has been described, however, the configuration is not limited to the example, and the event notification may be executed together with notification to other information processing apparatuses when the information of the printing apparatus 150 is changed next time.

As described above, the element data of which notification can be delayed is not included (is included as empty data) in the response data to the information acquisition request, and the element data is notified as event data, whereby the size of the response data can be reduced.

The response data in a case in which element data of all elements requested by the printing apparatus 150 is sent in response will be described with reference to FIG. 8A. A code 801 shows that the attribute information "Name="wsdst:

PrinterStatus"" and the attribute information "Valid="true"" are added to the element "wsdst:ElementData". The attribute value "wsdst:PrinterStatus" indicates that the element data of "wsdst:ElementData" is "PrinterStatus". The attribute value "true" indicates that the data enclosed in the elements "wsdst: ElementData" is valid. An element 802 is the start element "wsdst:PrinterStatus", and the element data "PrinterStatus" is stored between the start element and the end element. The element 802, which is the start element "wsdst:PrinterStatus", includes the prefix "wsdst". This indicates that the element data "PrinterStatus" is a public element. An element 803 is the start element "wsdst:DefaultPrintTicket", and the element data "DefaultPrintTicket", which is a public element, is stored between the start element and the end element. An element 804 is the start element "ihv:Status", and an element 805 is the start element "ihv:Capability". The prefix "ihv" indicates that the elements 804 and 805 are private elements. The data "Status" and the element data "Capability" are stored between the start elements and end elements, respectively. The response data illustrated in FIG. 8A indicates that a plurality of pieces of data is returned at one time. Since the response data illustrated in FIG. 8 includes data of a plurality of private elements and data of a plurality of public elements, the size of the response data may exceed the size limit of data that can be received by the information processing apparatus 100.

On the other hand, FIG. 8B shows that the data "Status" in FIG. 8A is returned in the form of empty data. A code 811 shows that the attribute information "Name="ihv:Status"" and the attribute information "Valid="false"" are added to the element "wsdst:ElementData". The element "wsdst:ElementData" in the code 811 is different from the element "wsdst:ElementData" in the code 801 in that the element "wsdst:ElementData" in the code 811 is empty data closed with "/>" at the end. The attribute value "false" indicates that element data of the element "wsdst:ElementData" is invalid (does not exist). A code 812 is also empty data. The code 812 is a response to the element data "delay" indicating that the element of the code 811 may be empty data, i.e., notification of the element can be delayed. Thus, the printing apparatus 150 responds with the code 812 in the form of empty data.

The empty data can be indicated as null, or data with no description other than the element closed with "/>" at the end.

As described above, FIG. 8B illustrates contents of an information acquisition request from which the data "Status" has been eliminated by the printing apparatus 150 having referred to the Bidi extension file 512 in FIG. 5B and determined in the processing in step S606 in FIG. 6 that the data of the element "Status" can be delayed. The printing apparatus 150 responds with the information acquisition response illustrated in FIG. 8B in the processing in step S609 in FIG. 6.

Figure 9:
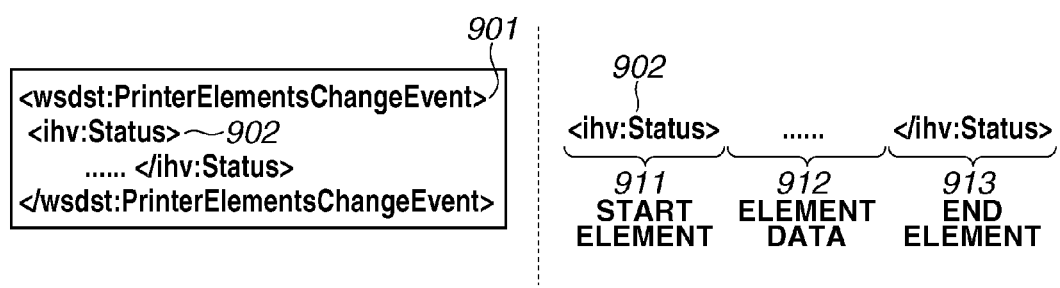
FIG. 9 is a diagram illustrating contents of event notification information.

FIG. 9 illustrates contents of PrinterElementsChangeEvent that is to be notified in the processing in step S610 in FIG. 6. An element 901 is the element "wsdst:PrinterElementsChangeEvent". As described above, a code 902 is the start element "ihv:Status" showing that the data "Status", which is a private element, is enclosed in the element 902. The data "Status" sent in the form of empty data in the information acquisition response in FIG. 8B is notified as event data illustrated in FIG. 9 in the processing in step S610. Accordingly, the information processing apparatus 100 receives the information acquisition response illustrated in FIG. 8B in step S404 and later receives the event data illustrated in FIG. 9 in the processing in step S413. In other words, the data "Status" is empty data at the time when the information processing apparatus 100 executes the information updating processing in step S405. However, the information processing apparatus 100 can acquire the data "Status" when the information processing apparatus 100 executes the information updating processing in step S414.

In the present exemplary embodiment, the operation has been described on the assumption that the operation is an operation executed at the time when the OS sends an information acquisition request for element data of a plurality of elements in a batch immediately after the connection is established between the information processing apparatus 100 and the printing apparatus 150. However, the operation may be an operation executed at the time when software other than the OS in the information processing apparatus 100 sends an information acquisition request for element data of a plurality of elements in a batch.

In the first exemplary embodiment, the configuration has been described in which the private element (511) corresponding to the private element (512) to which the identifier "_Delay" indicating that notification of the element can be delayed is added is notified in the form of empty data (811), which is an example of delay data, whereby the size of the information acquisition response is prevented from exceeding the size limit.

In a second exemplary embodiment, the configuration will be described in which only data of the public elements (802, 803) is sent in response while event notification (902) of data of the private element is sent to overcome the problem. In the configuration of the present exemplary embodiment, the information processing apparatus 100 is not required to transmit the private element (512) to which the identifier "_Delay" is added.

Figure 10:
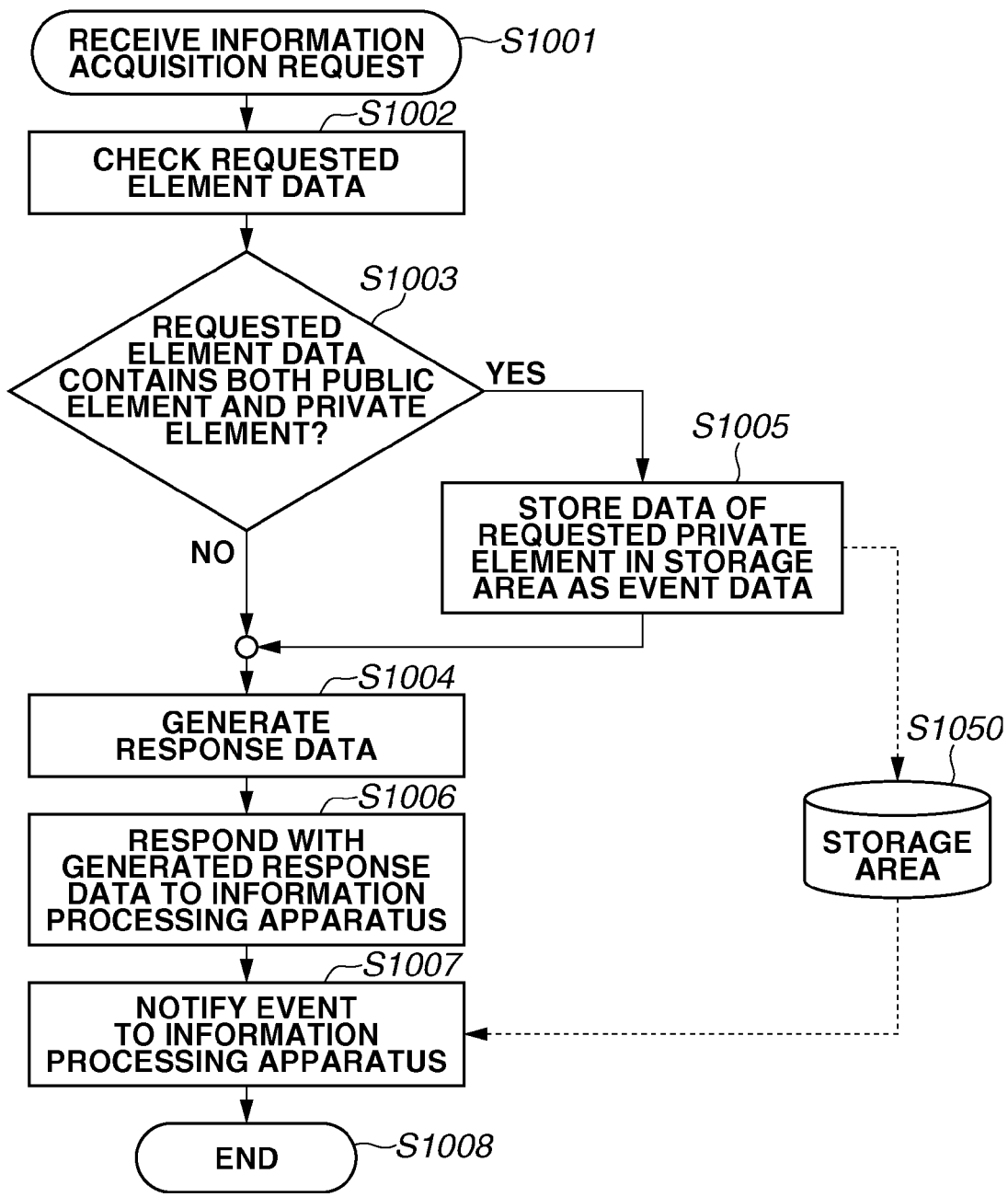
FIG. 10 is a flow chart illustrating processing of a printing apparatus having received an information acquisition request.

FIG. 10 is a flow chart illustrating processing of the printing apparatus 150 having received the information acquisition request in step S402. In step S1001, the printing apparatus 150 receives the information acquisition request, and then in step S1002, the printing apparatus 150 checks requested element data. In step S1003, the printing apparatus 150 determines whether the element data requested by the information acquisition request includes both data of a public element and data of a private element. In step S1003, if the printing apparatus 150 determines that the requested information is only data of a public element or data of a private element (NO in step S1003), then in step S1004, the printing apparatus 150 generates response data. The response data generated in the processing in step S1004 includes only data of a public element or data of a private element. In step S1006, the printing apparatus 150 responds with the response data generated in the processing in step S1004 to the information processing apparatus 100. In step S1007, the printing apparatus 150 determines whether a storage area S1050 stores event data. If no event data is stored in the storage area S1050, then in step S1008, the printing apparatus 150 ends the processing of the printing apparatus 150 having received the information acquisition request.

On the other hand, in step S1003, if the printing apparatus 150 determines that the requested information includes both data of a public element and data of a private element (YES in step S1003), then in step S1005, the printing apparatus 150 stores the requested private element as event data in the storage area S1050. Thereafter, in step S1004, the printing apparatus 150 generates response data including data of the requested public element and empty data of the requested private element. In step S1006, the printing apparatus 150 responds with the generated response data to the information processing apparatus 100. In step S1007, the printing apparatus 150 reads the event data stored in the storage area S1050 and executes event notification by transmitting the event data to the information processing apparatus 100 that has requested the acquisition of the information. In step S1008, the printing apparatus 150 ends the processing of the printing apparatus 150 having received the information acquisition request.

As described above, according to the present exemplary embodiment, the printing apparatus 150 responds with only the data of the public element while executing event notification of the data of the private element, whereby the size of the information acquisition response can be reduced. When data of a plurality of private elements is to be transmitted to the information processing apparatus 100 by event notification, the printing apparatus 150 may send event notification of the data of the plurality of private elements in a batch or may send event notification for each of the plurality of private elements.

In the second exemplary embodiment, the configuration is described in which the data of the public elements (802, 803) is separated from the data of the private element (902) (steps S1003 and S1005), whereby the size of the information acquisition response is reduced.

In a third exemplary embodiment, the configuration is described in which the event notification (902) of the private element (511) is executed only if the size of the response data exceeds the size limit, to overcome the problem.

Figure 11:
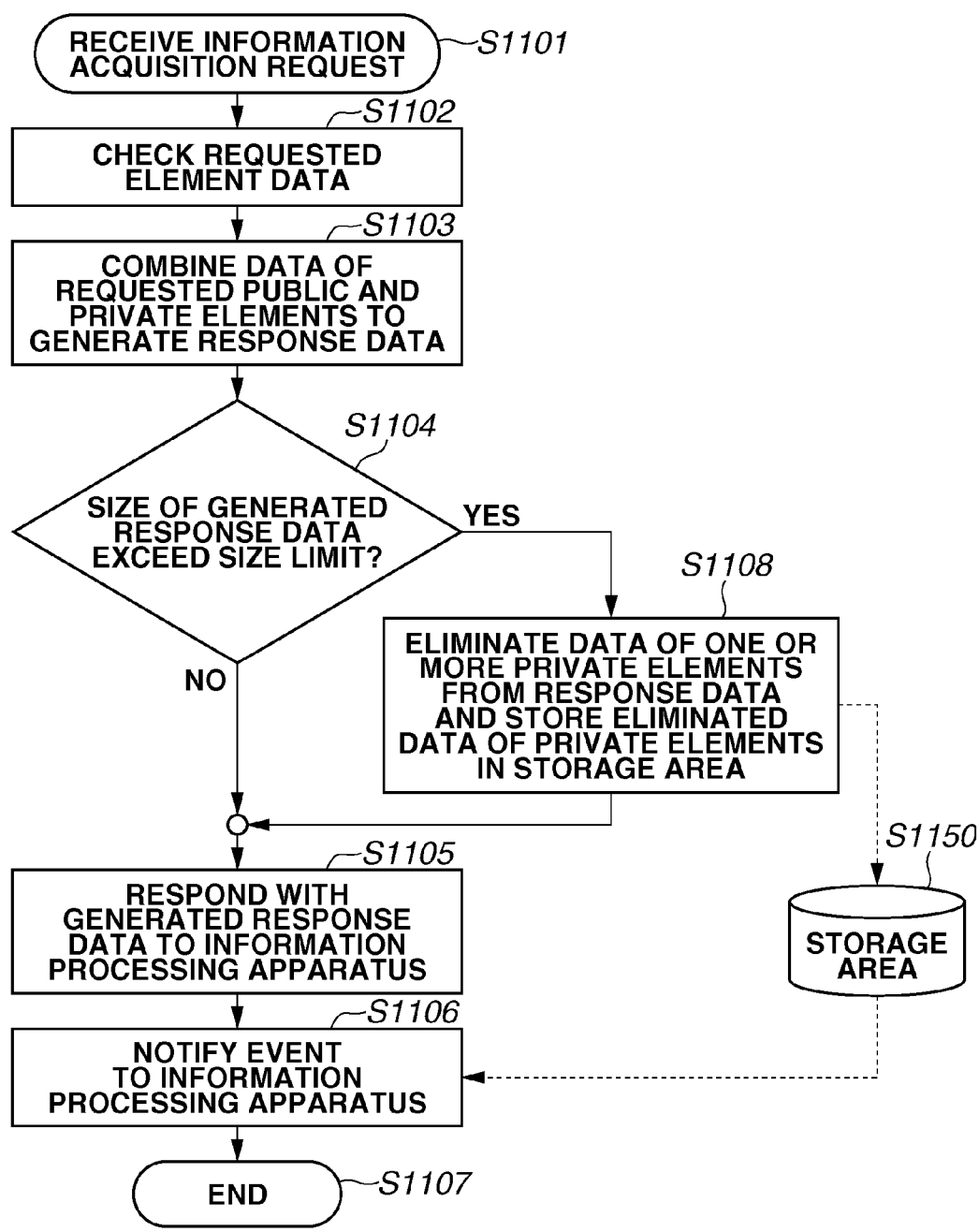
FIG. 11 is a flow chart illustrating processing of a printing apparatus having received an information acquisition request.

FIG. 11 is a flow chart illustrating processing of the printing apparatus 150 having received the information acquisition request in step S402. In step S1101, the printing apparatus 150 receives the information acquisition request, and then in step S1102, the printing apparatus 150 checks the requested element data. In step S1103, the printing apparatus 150 combines the data of the requested public element and the data of the requested private element together to generate response data. In step S1104, the printing apparatus 150 determines whether the size of the response data generated in the processing in step S1103 exceeds the size limit. If the printing apparatus 150 determines that the size of the response data does not exceed the size limit (NO in step S1104), then in step S1105, the printing apparatus 150 responds with the response data generated in the processing in step S1103 to the information processing apparatus 100. In step S1106, the printing apparatus 150 checks whether the storage area S1150 stores event data. If no event data is stored in the storage area S1150, then in step S1107, the printing apparatus 150 ends the processing of the printing apparatus 150 having received the information acquisition request.

On the other hand, in step S1104, if the printing apparatus 150 determines that the size of the response data exceeds the size limit (YES in step S1104), then in step S1108, the printing apparatus 150 eliminates the data of one or more private elements from the response data, and stores the eliminated data of the private elements in the storage area S1150. The elimination of data of a private element refers to changing the data of the private element to be eliminated from response data into empty data such as the empty data 811 illustrated in FIG. 8B. In step S1105, the printing apparatus 150 responds to the information processing apparatus 100 with the response data from which the data of the private elements has been eliminated in the processing in step S1108. In step S1106, the printing apparatus 150 reads the element data of the private elements stored in the storage area S1150, and sends event notification of the element data of the private elements as event data to the information processing apparatus 100 that has requested the acquisition of the information. In step S1107, the printing apparatus 150 ends the processing of the printing apparatus 150 having received the information acquisition request.

As described above, in the present exemplary embodiment, the printing apparatus 150 sends event notification of the element data of the private elements (502, 503) only if the size of the response data exceeds the size limit, whereby the size of the information acquisition response can be reduced as appropriate.

In the first to third exemplary embodiments, event notification of the data of the private elements is executed so that the size of the information acquisition response does not exceed the size limit.

In a fourth exemplary embodiment, the information processing apparatus 100 divides an information acquisition request and sends the divided information acquisition requests separately to overcome the problem. However, it is a waste of communications for the information processing apparatus 100 to separate all elements of an information acquisition request and then request each one of the elements after the connection is established between the information processing apparatus 100 and the printing apparatus 150. Furthermore, depending on software (OS and printer driver 321, application 301) in the information processing apparatus 100, there may be element data that is desirably acquired promptly after the connection with the printing apparatus 150 is established. Thus, the element data to be requested separately is desirably element data that is data of a private element and does not cause any problem even if the element data is not acquired promptly after the connection is established between the information processing apparatus 100 and the printing apparatus 150.

Examples of element data that is desirably acquired promptly after the connection with the printing apparatus 150 is established include information "Capability" 805 indicating the printing capability of the printing apparatus 150. Based on the information "Capability" 805, the OS generates settable information such as the size and type of sheet that can be used as print settings of the application 301. Users demand that the print settings of the application 301 to which the settable information is applied can be used promptly after the information processing apparatus 100 and the printing apparatus 150 are connected.

FIG. 5C is a diagram illustrating contents of the Bidi extension file 324. FIG. 5C is different from FIG. 5A in that the attribute information "delay="true"" is added as shown in a code 521. The attribute value of the attribute "delay" is "true". This indicates that an information acquisition request (delayed data acquisition request) from the information processing apparatus 100 for the information "ihv:Status" of the printing apparatus 150 can be delayed.

Figure 12:
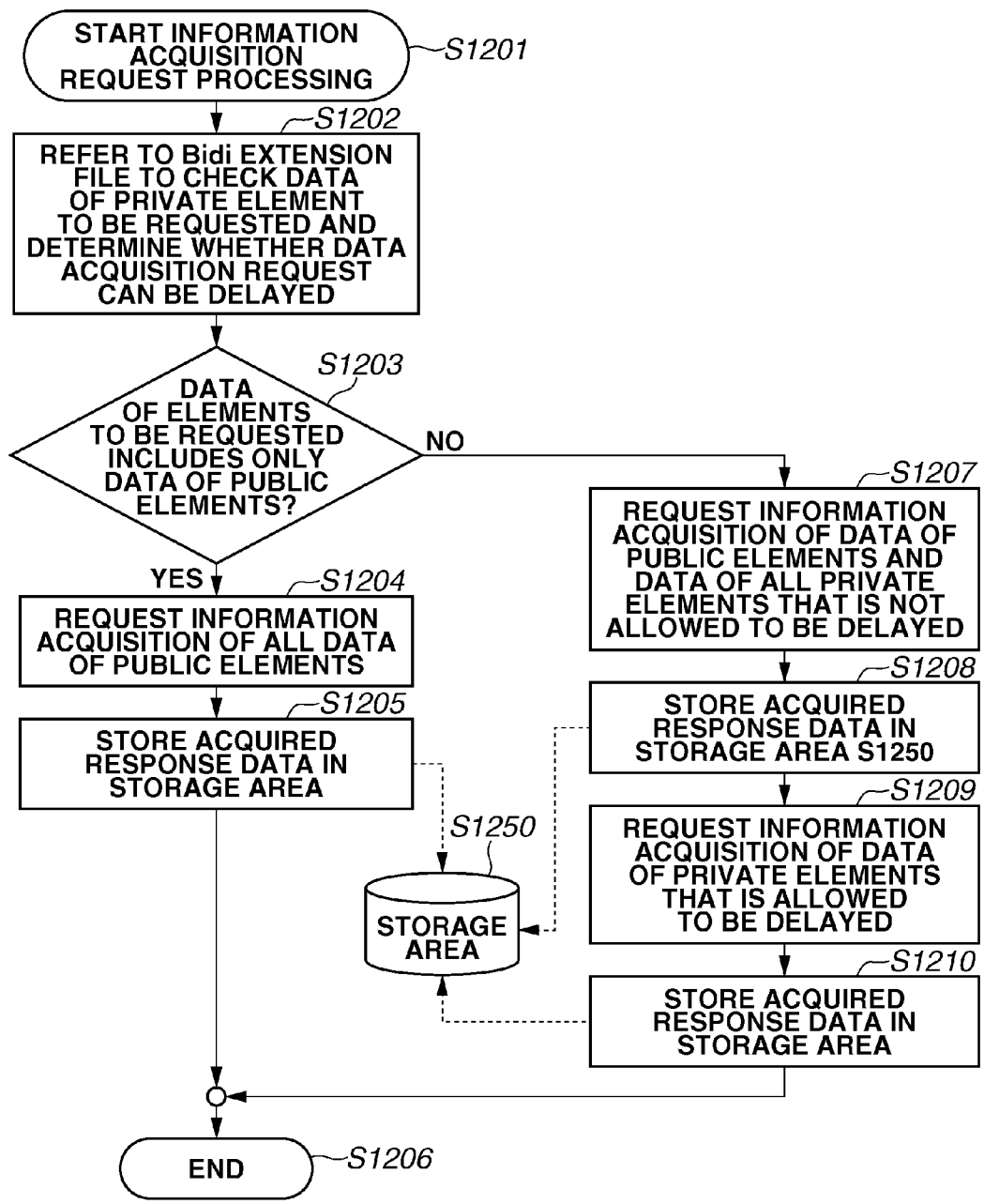
FIG. 12 is a flow chart illustrating information acquisition request processing of an information processing apparatus.

FIG. 12 is a flow chart illustrating information acquisition request processing of the information processing apparatus 100. In step S1201, the information processing apparatus 100 starts the information acquisition request processing, and then in step S1202, the information processing apparatus 100 refers to the contents of the Bidi extension file 324 to check data of a private element to be requested and determine whether a data acquisition request for the data can be delayed. In step S1203, the information processing apparatus 100 determines whether the data of the elements to be requested includes only data of a public element. If the data is only the data of a public element (YES in step S1203), then in step S1204, the information processing apparatus 100 requests acquisition of information of data of all public elements in a batch.

The determination in step S1203 is conducted by determining whether the data of the private element to be requested is described in the Bidi extension file. If the data of the private element to be requested is not described in the Bidi extension file, the information processing apparatus 100 determines that the element data to be requested is only the data of the public element requested by the OS. Thus, the result of the determination in step S1203 is "YES". On the other hand, if the data of the private element to be requested is described in the Bidi extension file, the information processing apparatus 100 determines that the element data to be requested is the data of the public element requested by the OS and the data of the private element requested by the Bidi extension file. Thus, the result of the determination in step S1203 is "NO".

In step S1205, after the information processing apparatus 100 acquires response data in response to the processing in step S1204, the information processing apparatus 100 stores the acquired response data in a storage area S1250, and then in step S1206, the information processing apparatus 100 ends the information acquisition request processing.

On the other hand, in the determination in step S1203, if the information processing apparatus 100 determines that the data of the element to be acquired is not only the data of the public element (NO in step S1203), then in step S1207, the information processing apparatus 100 requests, in a batch, acquisition of information of the data of public elements and the data of all private elements that is not allowed to be delayed. In step S1208, after the information processing apparatus 100 acquires response data in response to the processing in step S1207, the information processing apparatus 100 stores the acquired response data in the storage area S1250. In step S1209, the information processing apparatus 100 requests acquisition of information of the data of the private elements that is allowed to be delayed. In step S1210, after the information processing apparatus 100 receives the response data in response to the processing in step S1209, the information processing apparatus 100 stores the acquired response data in the storage area S1250, and then in step S1206, the information processing apparatus 100 ends the information acquisition request processing.

As described above, in the present exemplary embodiment, only a request for information that is allowed to be acquired by a delayed data acquisition request is delayed, so that the information acquisition request can be divided as appropriate not to cause the response data to exceed the size limit.

As described above, the processing in step S1209 is executed after the processing in step S1208 is completed, so that the processing load per unit time of the image processing apparatus can be reduced. Instead of executing the processing in step S1209 after the completion of the processing in step S1208, the private data may be requested in step S1209 without waiting for the reception and storage of the response data in step S1208.

In the present exemplary embodiment, the port monitor 314 of the OS is configured to execute the processing illustrated in FIG. 12. Thus, the Bidi extension file 324 of the printer driver 321 is configured to notify the port monitor 314 that a delayed data acquisition request is allowed so that the printer driver 321 developed by an IHV that does not expect a delayed data acquisition request will not be affected.

However, if every printer driver developed by an IHV recognizes that a delayed data acquisition request may occur, the delay allowance information 521 of the Bidi extension file 324 is not required. That is to say, the technical problem can be solved by the configuration in which the port monitor 314 always sends an information acquisition request for data of private elements separately from an information acquisition request for data of public elements.

In the fourth exemplary embodiment, the configuration is described in which the information acquisition request to be made by the information processing apparatus 100 is divided in advance. In the configuration of the fourth exemplary embodiment, since the information processing apparatus 100 cannot be informed of the size of response data in advance, the information acquisition request is divided in advance and then sent.

In a fifth exemplary embodiment, the configuration will be described in which the information processing apparatus 100 requests acquisition of information of element data of all elements in a batch, and if, for example, the size of response data exceeds the size limit, the information processing apparatus 100 requests acquisition of the information again.

FIG. 13 is a flow chart illustrating information acquisition request processing of the information processing apparatus 100. In step S1301, the information processing apparatus 100 starts the information acquisition request processing and then in step S1302, the information processing apparatus 100 refers to the Bidi extension file 324, and checks data of a private element to be requested. In step S1303, the information processing apparatus 100 requests acquisition of information of data of all elements at one time. After the printing apparatus 150 receives the request for acquisition of the information, the printing apparatus 150 adds the attribute value "retry", which will be described below, to at least one of the requested element data, and then transmits the response data. In step S1304, after the information processing apparatus 100 acquires the response data in response to the processing in step S1303, the information processing apparatus 100 stores the acquired response data in the storage area S1350. In step S1305, the information processing apparatus 100 checks the response data received in the processing in step 1304, and determines whether there is any data to which the retry identifier is added.

The retry identifier is an identifier indicating that the information processing apparatus 100 is to acquire again the element data to which the retry identifier is added from the printing apparatus 150. The retry identifier will be described in detail with reference to FIG. 8C. FIG. 8C illustrates response data. In a code 821, the attribute value "retry" is added to the attribute "Valid". The attribute value "retry" indicates that an information acquisition request is required again to acquire the data of the element "ihv:Status".

In the determination in step S1305, if the information processing apparatus 100 determines that there is an element to which the retry identifier "retry" is added (YES in step S1305), then in step S1306, the information processing apparatus 100 requests again the element "ihv:Status" to which the retry identifier "retry" is added. Specifically, the information processing apparatus 100 sends the information acquisition request again to realize the processing in step S1306. In step S1307, after the information processing apparatus 100 acquires the response data in response to the processing in step S1306, the information processing apparatus 100 stores the acquired response data in the storage area S1350. In step S1308, the information processing apparatus 100 ends the information acquisition request processing.

On the other hand, in the determination in step S1305, if the information processing apparatus 100 determines that there is no element to which the retry identifier "retry" is added (NO in step S1305), then the information processing apparatus 100 ends the information acquisition request processing.

As described above, according to the present exemplary embodiment, for example, the information processing apparatus 100 is only required to request again acquisition of information of only the data of the element to which the retry identifier is added if the response data exceeds the size limit. This can minimize the number of times of the information acquisition request.

While the configuration has been described in which the attribute value "retry" of the attribute "valid" is used as the retry identifier in the present exemplary embodiment, the retry identifier may be expressed by an attribute other than the attribute "valid".

It is apparent that an object of the present subject matter can be attained also by supplying to a system or an apparatus a storage medium that stores program codes of software configured to realize the functions of the exemplary embodiments described above and by causing a computer (or CPU or MPU) of the system or the apparatus to read and execute the program codes stored in the storage medium. In this case, the program codes read from the storage medium realize the functions of the exemplary embodiments, and the present subject matter may comprise the storage medium storing the program codes.

Examples of storage media for supplying the program codes that can be used include a flexible disk, a hard disk, an optical disk, a magneto optical disk, a compact disk read-only memory (CD-ROM), a CD recordable (CD-R), a magnetic tape, a non-volatile memory card, a ROM, and a digital versatile disk (DVD).

It is apparent that the scope of the present subject matter encompasses not only the cases in which a computer executes read program codes to realize the functions of the exemplary embodiments described above but also the cases in which an OS running on the computer or the like executes a part of or the entire processing according to instructions of the program codes so that the processing realizes the functions of the exemplary embodiments described above.

It is also apparent that the scope of the present subject matter encompasses the cases in which program codes read from a storage medium are written in a memory included in a function expansion board inserted in a computer or a function expansion unit connected to the computer and thereafter a CPU or the like included in the function expansion board or the function expansion unit executes a part of or the entire processing according to instructions of the program codes so that the processing realizes the functions of the exemplary embodiments described above.

The present subject matter can reduce the possibility that the size of response data exceeds a size limit.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-060267 filed Mar. 22, 2013, which is hereby incorporated by reference herein in its entirety.

What is claimed is:

1. An image processing apparatus comprising:
a processor; and
a memory, the memory storing instructions that, when executed by the processor, cause the processor to:
receive a request for first element data and second element data from an information processing apparatus;
respond, to the information processing apparatus, with delay data indicating that transmission of the second element data is to be delayed and the first element data, as response data in response to the request; and
transmit the second element data to the information processing apparatus after responding with the response data,
wherein a data size of the delay data is smaller than a data size of the second element data, and
wherein when a status of the image processing apparatus is changed, event data indicating a status of the image processing apparatus is notified,
wherein the delay data is empty data.

2. The image processing apparatus according to claim 1, wherein the processor is further configured to:
determine whether the second element data is data of a private element; and
determine whether notification of the second element data can be delayed,
wherein if it is determined that the second element data is data of a private element and it is determined that notification of the second element data can be delayed, the image processing apparatus responds with the delay data and the first element data as the response data.

3. The image processing apparatus according to claim 1, wherein the processor is further configured to:
determine whether the first element data is data of a public element and the second element data is data of a private element,
wherein if it is determined that the first element data is data of a public element and the second element data is data of a private element, the image processing apparatus responds with the delay data and the first element data, as the response data.

4. The image processing apparatus according to claim 1, wherein the processor is further configured to:
generate response data including the first element data and the second element data; and
determine whether a size of the response data exceeds a size limit,
wherein if it is determined that the size of the response data exceeds the size limit, the second element data is eliminated from the response data and then the image processing apparatus responds with the delay data indicating that notification of the second element data is to be delayed and the first element data as the response data in response to the request.

5. The image processing apparatus according to claim 1, wherein an identifier is received, and
wherein the identifier is included in the response data in response to the request.

6. The image processing apparatus according to claim 1, wherein the second element data as event data is notified after the image processing apparatus responds with the response data.

7. A control method for an image processing apparatus comprising:
- receiving a request for first element data and second element data from an information processing apparatus;
- responding, to the information processing apparatus, with delay data indicating that transmission of the second element data is to be delayed and the first element data, as response data in response to the request; and
- transmitting the second element data to the information processing apparatus after responding with the response data,
- wherein a data size of the delay data is smaller than a data size of the second element data, and
- wherein when a status the image processing apparatus is changed, event data indicating a status of the image processing apparatus is notified,
- wherein the delay data is empty data.

8. The control method according to claim 7, further comprising:
- determining, prior to responding to the received request, whether the second element data is data of a private element;
- determining, prior to responding to the received request whether notification of the second element data can be delayed; and
- responding with the delay data and the first element data as the response data in response to the received request if it is determined that the second element data is data of a private element and that notification of the second element data can be delayed.

9. The control method according to claim 7, further comprising:
- determining whether the first element data is data of a public element and the second element data is data of a private element; and
- responding with the delay data and the first element data as the response data in response to the received request if it is determined that the first element data is data of a public element and the second element data is data of a private element.

10. The control method according to claim 7, further comprising:
- generating response data including the first element data and the second element data;
- determining whether a size of the response data exceeds a size limit; and
- eliminating the second element data from the response data and then responding with the delay data indicating that notification of the second element data is to be delayed and the first element data as the response data in response to the received request if it is determined that the size of the response data exceeds the size limit.

11. The control method according to claim 7, further comprising:
- receiving an identifier; and
- responding with the response data including the identifier, in response to the received request.

12. The control method according to claim 7, wherein the second element data is notified as event data after responding with the response data.

13. A non-transitory storage medium storing a program for causing an image processing apparatus to execute a method, the method comprising:
- receiving a request for first element data and second element data from an information processing apparatus;
- responding, to the information processing apparatus, with delay data indicating that transmission of the second element data is to be delayed and the first element data, as response data in response to the request; and
- transmitting the second element data to the information processing apparatus after responding with the response data,
- wherein a data size of the delay data is smaller than a data size of the second element data, and
- wherein when a status of the image processing apparatus is changed, event data indicating a status of the image processing apparatus is notified,
- wherein the delay data is empty data.

* * * * *